United States Patent
Teschke

(10) Patent No.: US 8,505,436 B2
(45) Date of Patent: Aug. 13, 2013

(54) PNEUMATIC ACTUATOR WITH A POSITION CONTROL AND POSITION ADJUSTMENT

(75) Inventor: Ulrich Teschke, Rheinberg (DE)

(73) Assignee: Norgren GmbH, Alpen (DE)

( * ) Notice: Subject to any disclaimer, the term of this patent is extended or adjusted under 35 U.S.C. 154(b) by 839 days.

(21) Appl. No.: 12/669,820

(22) PCT Filed: Aug. 8, 2007

(86) PCT No.: PCT/EP2007/007017
§ 371 (c)(1),
(2), (4) Date: Jan. 20, 2010

(87) PCT Pub. No.: WO2009/018843
PCT Pub. Date: Feb. 12, 2009

(65) Prior Publication Data
US 2010/0193038 A1   Aug. 5, 2010

(51) Int. Cl.
*F15B 13/16* (2006.01)
(52) U.S. Cl.
USPC .......................................................... 91/390
(58) Field of Classification Search
USPC .................. 91/388, 390; 92/110, 112, 117 R, 92/117 A
See application file for complete search history.

(56) References Cited

U.S. PATENT DOCUMENTS

| | | | |
|---|---|---|---|
| 3,113,590 A | 12/1963 | Olson | |
| 7,237,473 B2 | 7/2007 | Herbst | |
| 2004/0099320 A1 | 5/2004 | Oniduka et al. | |
| 2007/0193639 A1 | 8/2007 | Ling et al. | |
| 2008/0163837 A1 | 7/2008 | Daut | |

FOREIGN PATENT DOCUMENTS

| | | |
|---|---|---|
| CN | 1616799 A | 5/2005 |
| DE | 3915584 A1 | 11/1990 |
| DE | 102004049313 A1 | 11/2005 |
| DE | 102005003446 A1 | 8/2006 |
| DE | 1020050071041 A1 | 8/2006 |
| JP | 63072901 | 4/1988 |
| JP | 08093935 | 12/1996 |
| JP | 2003042311 | 2/2003 |
| JP | 2003113801 | 4/2003 |
| JP | 36020607 B2 | 2/2005 |
| RU | 2190784 C2 | 10/2002 |
| RU | 2266439 C2 | 12/2005 |
| WO | 9007063 A1 | 6/1990 |
| WO | 2005084448 A1 | 9/2005 |

*Primary Examiner* — Michael Leslie
(74) *Attorney, Agent, or Firm* — The Ollila Law Group LLC

(57) ABSTRACT

A proportional actuator valve (110) adapted for position control and position adjustment is provided. The proportional actuator valve (110) includes a valve housing (112) having at least two chambers (324, 325). The chambers are separated by one or more sealing members (322). A valve slider (113) is provided that is movable in the valve housing (112). One or more grooves (329) are formed in the valve slider (113). The one or more grooves (329) pneumatically communicate with the two chambers (324, 325) of the valve housing (112). One or more bores (327, 328) are also formed in the valve slider (113). The one or more bores (327, 328) pneumatically communicate with the one or more grooves (329). Movement of the valve slider (113) relative to the valve housing (112) provides a pneumatic valve action.

20 Claims, 5 Drawing Sheets

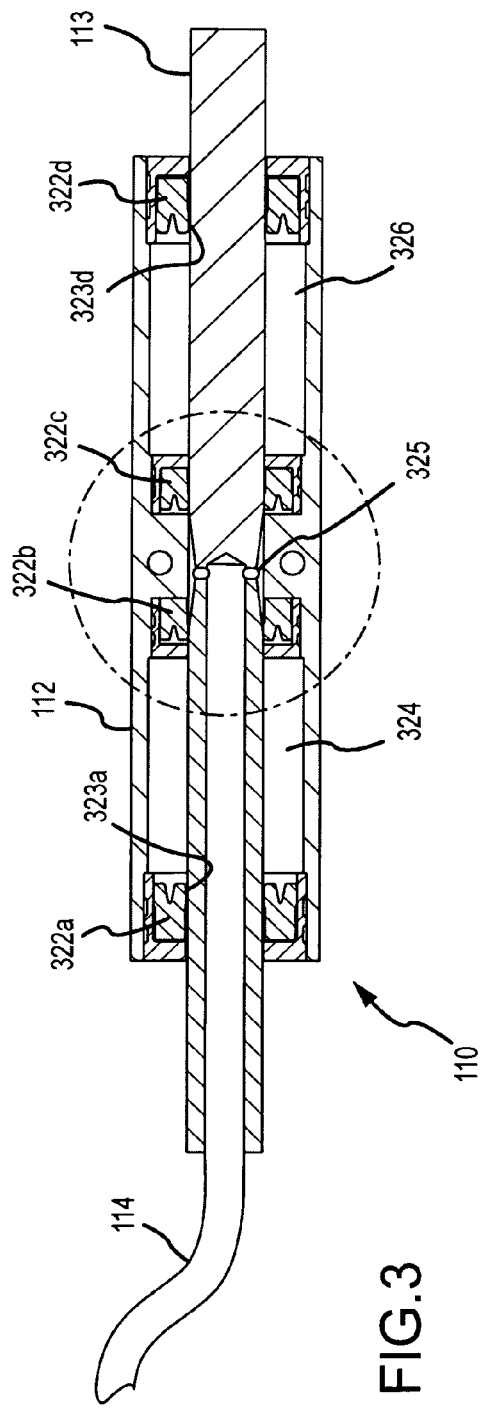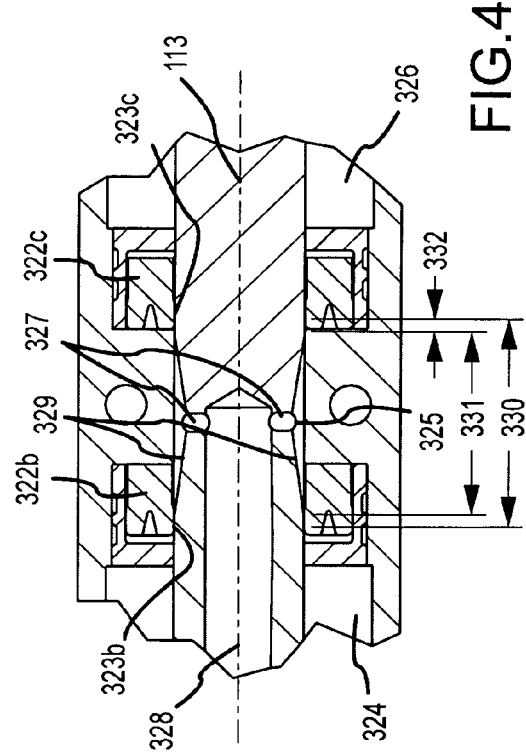

PNEUMATIC ACTUATOR WITH A POSITION CONTROL AND POSITION ADJUSTMENT

TECHNICAL FIELD

The present invention relates to a pneumatic actuator, and more particularly, to a pneumatic actuator with a position control and position adjustment.

BACKGROUND OF THE INVENTION

An actuator is a device that performs some mechanical action. One actuator is a piston, wherein a plunger of the piston moves in a reciprocating manner. The plunger can therefore be connected to some manner of work piece or other mechanical system.

While some actuators are used to move a work piece, other actuators are employed to maintain a constant position of a work piece. This can become difficult when the force applied by or on the work piece is not constant. Under variable forces, the actuator may tend to oscillate between optimal positions.

One attempt to address this problem has been to provide a pneumatic actuator. A pneumatic actuator provides pneumatic pressure to one side of a plunger. The pressure provided can be supplied such that the plunger either remains in a fixed position or is moved in a desired direction. The problem with an actuator employed to maintain a desired position is that when the force on the actuator changes, the pneumatic pressure supplied to the actuator must also change in order to maintain the desired position. For example, if the force applied to the actuator increases, the pneumatic pressure must also increase. Similarly, if the force applied to the actuator decreases, the pneumatic pressure must also decrease.

A problem in the past has been the ability to adjust the pneumatic pressure in response to changes in the force applied on the actuator. One method employed incorporates positioning a shift valve on the work piece and having the shift valve communicate pneumatically with the actuator. The shift valve moves with the actuator and so if the actuator moves, so does the shift valve. Once the actuator moves a pre-determined distance, the shift valve either opens or closes to allow the pneumatic pressure in the actuator to increase, decrease, or remain constant. The problem with incorporating a shift valve is that a shift valve typically has a constant cross sectional area for air to flow and therefore, only knows the positions "open" and "closed." Therefore, the cross-sectional area of these shift valves must not be chosen too big, because a quick reaction on short strokes would cause resonance oscillations. However, a quick reaction time is typically desired. Therefore, the cross-sectional area of the valve must be balanced against the risk of resonance oscillations. Because of this compromise, shift valves typically have the inherent problem of overshooting the target position. This is because the same amount of air is provided/released regardless of how close the actuator is to its desired position.

Therefore, there is a need in the art to provide a proportional actuator valve which adequately maintains the position of an actuator and can adjust the position of the actuator.

SUMMARY OF THE INVENTION

A proportional actuator valve adapted for position control and position adjustment is provided according to an embodiment of the invention. The proportional actuator valve comprises a valve housing having at least two chambers. The proportional actuator valve also comprises a valve slider, wherein the valve slider is movable within the valve housing. One or more grooves are formed in the proportional actuator valve. The one or more grooves pneumatically communicate with the at least two chambers of the valve housing. One or more bores are formed in the proportional actuator valve. The one or more bores pneumatically communicate with the one or more grooves. Movement of the valve slider relative to the valve housing provides a pneumatic valve action.

A method for forming a proportional actuator valve is provided according to an embodiment of the invention. The method comprises providing a valve housing and separating the valve housing into at least two chambers using a plurality of sealing members. The method further comprises positioning a valve slider within the valve housing. The method further comprises forming one or more bores in the proportional actuator valve. The method further comprises forming one or more grooves in the proportional actuator valve. The one or more grooves communicate with the one or more bores and with the at least two chambers.

A method for regulating pneumatic air to a pneumatic actuator is provided according to an embodiment of the invention. The method comprises coupling an element to a pneumatic actuator wherein a first force acts on the element and the pneumatic actuator provides a second force on the element opposite the first force. The method further comprises providing a proportional actuator valve. The proportional actuator valve controls the supply of air to and from the pneumatic actuator. The proportional actuator valve comprises one or more grooves. The cross sectional area open for air flow is determined by a change in the first force acting on the element.

Aspects

In one aspect of the apparatus, the valve housing comprises at least three chambers.

In another aspect of the apparatus, the chambers are separated with a plurality of sealing members.

In yet another aspect of the apparatus, at least one of the chambers is charged with an operating pressure.

In yet another aspect of the apparatus, at least one of the chambers is exhausted outside of the proportional actuator valve.

In yet another aspect of the apparatus, a first end of the valve slider is coupled to a base.

In yet another aspect of the apparatus, a portion of the valve housing is coupled to a base.

In yet another aspect of the apparatus, the valve slider is adjustable with respect to the valve housing.

In yet another aspect of the apparatus, the one or more grooves comprise a non-uniform cross sectional area.

In yet another aspect of the apparatus, the one or more grooves comprise a substantially uniform cross sectional area.

In yet another aspect of the apparatus, the one or more grooves are formed in the valve slider.

In yet another aspect of the apparatus, the one or more grooves comprise a plurality of bores.

In yet another aspect of the apparatus, the one or more grooves are formed in at least one of the chambers.

In yet another aspect of the apparatus, the valve slider further comprises a plurality of sealing members.

In yet another aspect of the apparatus, the one or more grooves comprises a cross sectional area that is shaped such that the cross sectional area decreases with increasing distance from the one or more bores.

In yet another aspect of the apparatus, the maximum cross sectional area of the one or more grooves is at least as large as a cross sectional area of the one or more bores.

In yet another aspect of the apparatus, the maximum cross sectional area of the one or more grooves is smaller than the cross sectional area of the one or more bores.

In yet another aspect of the apparatus, the one or more bores are formed in the valve slider.

In yet another aspect of the apparatus, the one or more bores are formed in the valve housing.

In yet another aspect of the apparatus, the proportional actuator valve is coupled to an element, the element is also coupled to an actuator.

In yet another aspect of the apparatus, the proportional actuator valve is coupled to the element using a lever system.

In yet another aspect of the apparatus, the proportional actuator valve has a stroke which is different from a stroke of the actuator.

In yet another aspect of the apparatus, the proportional actuator valve has a stroke which has a different direction from a stroke of the actuator.

In yet another aspect of the apparatus, the proportional actuator valve has a stroke which is substantially the same as the stroke of the actuator.

In one aspect of the method, the method further comprises separating the valve housing into at least three chambers using a plurality of sealing members.

In another aspect of the method, the method further comprises coupling the valve slider with a base.

In yet another aspect of the method, the method further comprises coupling the valve housing with a base.

In yet another aspect of the method, the valve slider is adjustable with respect to the valve housing.

In yet another aspect of the method, the one or more bores are formed in the valve slider.

In yet another aspect of the method, the one or more bores are formed in the valve housing.

In yet another aspect of the method, the method further comprises forming the one or more grooves having a non-uniform cross sectional area.

In yet another aspect of the method, the method further comprises forming the one or more grooves having a substantially uniform cross sectional area.

In yet another aspect of the method, the method further comprises forming the one or more grooves in the valve slider.

In yet another aspect of the method, the method further comprises forming the one or more grooves in the valve housing.

In yet another aspect of the method, the method further comprises forming the one or more grooves as a plurality of bores.

In yet another aspect of the method, the one or more grooves comprise a shape such that the cross sectional area decreases with increasing distance from the one or more bores.

In yet another aspect of the method, the method further provides at least one of the at least three chambers with an operating pressure.

In yet another aspect of the method, the method further provides at least one of the at least three chambers with communication to an exhaust.

In yet another aspect of the method, the proportional actuator valve further comprises a valve housing, wherein the valve housing is coupled to the element.

In yet another aspect of the method, the method further comprises using a lever system to couple the proportional actuator valve to the element.

In yet another aspect of the method, the proportional actuator valve comprises a stroke different than a stroke of the element.

In yet another aspect of the method, the proportional actuator valve comprises a stroke with a different direction than a stroke of the element.

In yet another aspect of the method, the method further comprises forming the one or more grooves in a valve slider of the proportional actuator valve.

In yet another aspect of the method, the method further comprises forming the one or more grooves with a variable cross sectional area.

In yet another aspect of the method, the method further comprises forming one or more bores in the valve slider to communicate with the actuator and forming the one or more grooves with a shape such that the cross sectional area of the one or more grooves decreases with increasing distance from the one or more bores.

In yet another aspect of the method, the method further comprise positioning the one or more grooves such that the rate at which air is supplied to the actuator by the proportional actuator valve increases as the stroke of the proportional actuator valve increases.

In yet another aspect of the method, the proportional actuator valve reduces oscillations of the pneumatic actuator.

BRIEF DESCRIPTION OF THE DRAWINGS

FIG. 3 shows a cross sectional view of the proportional actuator valve according to an embodiment of the invention.

FIG. 4 shows a cross sectional view of the middle chamber of the proportional actuator valve according to an embodiment of the invention.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
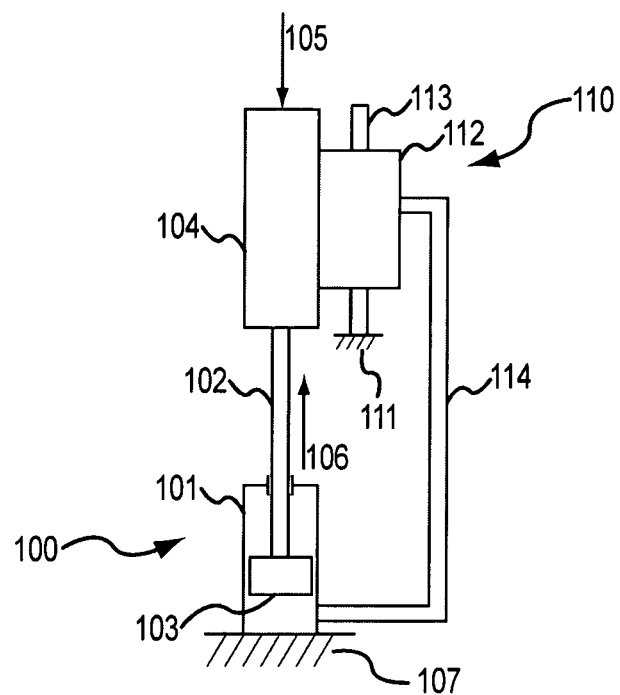
FIG. 1 shows an actuator with a proportional actuator valve according to an embodiment of the invention.

FIG. 1 schematically shows a pneumatic actuator 100. The pneumatic actuator 100 includes a housing 101, a rod 102, and a plunger 103. While the pneumatic actuator 100 is shown as a single acting cylinder, it should be understood that the actuator could also be a double acting cylinder. In the embodiment shown, the housing 101 is positioned on a base 107 and the rod 102 is coupled at a first end to the plunger 103 and to an element 104 at a second end. However, it should be understood that in alternative embodiments, the housing 101 could be coupled to the element 104 and the end of the rod 102 could be coupled to the base 107.

The rod 102 transfers mechanical force from the actuator 100 to the element 104. While the actuator 100 is shown with the rod 102, the actuator 100 in some embodiments can comprise a carriage that moves relative to an external surface of the actuator housing 101, i.e., the pneumatic actuator 100 comprises a rodless-type cylinder or an air bellow, for example.

The element 104 may have one or more forces acting upon it. As shown in FIG. 1, a first force 105 is provided by some work load, for example. Also acting on element 104 is a second force 106 provided by the actuator 100. In order to maintain the element 104 in a substantially constant position, the second force 106 must be held substantially equal to the first force 105. According to another embodiment of the invention, the second force 106 is either greater than or less than the first force 105, and therefore, the element 104 moves in the direction of the greater force.

In some embodiments, it may be advantageous to control the position of the element 104. Provided coupled to element 104 is a proportional actuator valve 110, which pneumatically communicates with the actuator 100 using connection lines 114, for example. The proportional actuator valve 110 may be coupled to the element 104 by known means. According to one embodiment, the proportional actuator valve 110 comprises a 3/3-way valve. However, it should be understood that the proportional actuator valve 110 should not be limited to this type of valve and other known valves, such as a 5/3-way valve may be used, such as when the pneumatic actuator 100 comprises a double acting cylinder, for example. The present invention may employ other known valves, and the precise valve used should not be limited by the examples provided above.

The proportional actuator valve 110 comprises a housing 112 and a valve slider 113. On at least one end, the valve slider 113 is coupled to a base 111. In alternative embodiments, the valve slider 113 could be coupled to the element 104 rather than the housing 112 being coupled to the element 104 as shown in the figures. In this alternative embodiment, a portion of the housing 112 could be coupled to the base 111. In either embodiment, the base 111 may be provided as a movable base, wherein the base 111 is adjusted to obtain the desired actuator position. Movement of the base 111 causes the valve slider 113 to adjust relative to the valve housing 112. The adjustment of the desired actuator position is described in further detail below.

Figure 2:
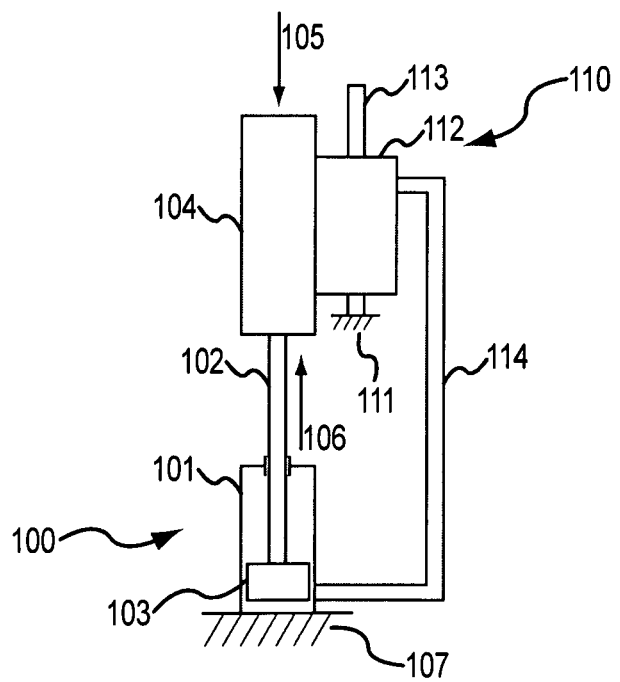
FIG. 2 shows an actuator with a proportional actuator valve in a position prior to the valve actuator providing pneumatic fluid to the actuator.

FIG. 2 shows the actuator 100 where the first force 105 is greater than the second force 106. In this embodiment, the element 104 has moved down from its desired position. As shown, the plunger 103 has moved closer to the base 107 than as shown in FIG. 1. Along with the element 104 moving, the proportional actuator valve 110 has also moved with respect to the valve slider 113. In response to this movement, the proportional actuator valve 110 supplies pneumatic pressure to the bottom of the actuator 100. As pressure is supplied to the actuator 100, the second force 106 provided by the actuator 100 increases, thus pushing the plunger 103 and rod 102 in the upwards direction as shown in FIGS. 1 & 2. The proportional actuator valve 110 will continue to supply pneumatic pressure to the actuator 100 until the element 104 and actuator valve housing 112 return to their original desired positions.

If instead, the first force 105 decreases, the element 104 and actuator valve housing 112 would move in the upwards direction (not shown). In this case, the proportional actuator valve 110 would respond by releasing pneumatic pressure from the actuator 100 to the environment. The release of pneumatic pressure results in the element 104 and actuator valve housing 112 returning to their original desired positions.

The desired position of the element 104 and actuator valve housing 112 can be adjusted by the operator, for example. As discussed in greater detail below, the position of the valve housing 112 relative to the valve slider 113 determines whether pneumatic pressure is supplied to or released from the actuator 100. Thus, by adjusting the base 111, which is coupled to the valve slider 113, the desired position of the element 104 can be adjusted. This is possible because the proportional actuator valve 110 will supply or release pneumatic pressure until the valve slider 113 returns to the "middle" position of the proportional actuator valve 110. Therefore, even if the first force 105 does not change, the position of the element 104 can be changed by adjusting the position of the base 111. For example, if it is desired to raise the element 104, the base 111 can be raised. In response to the base 111 and therefore, the valve slider 113 raising, the proportional actuator valve 110 will supply pneumatic pressure to the actuator 100. Because the first force 105 has not changed, the second force 106 will be greater than the first force 105. The proportional actuator valve 110 will supply pneumatic pressure until the element 104 is raised to its new desired position.

If it is desired to lower the element 104, the same steps may be taken; however, the base 111 will be lowered rather than raised. In this case, the proportional actuator valve 110 will release pneumatic pressure until the element 104 lowers to the new desired position.

FIG. 3 shows a cross sectional view of the proportional actuator valve 110 according to an embodiment of the invention. The proportional actuator valve 110 includes a housing 112, a movable slider 113, sealing members 322a-d, sealing points 323a-d, and chambers 324, 325, and 326.

While four sealing members are shown, it should be understood that more or less sealing members may be used. Similarly, while three chambers are shown in FIG. 3, it should be understood that the proportional actuator valve 110 could include any number of chambers and reference is made to three chambers for the purposes of clarity and consistency. According to one embodiment, at least one of the chambers communicates pneumatically with the operating pressure. In some embodiments, the first chamber 324 communicates pneumatically with the operating pressure, which can be provided by a pressurized air supply (not shown). The discussion below refers solely to the first chamber 324 being in communication with the operating pressure for the purpose of clarity. However, it should be understood that other chambers may be in communication with the operating pressure in addition to or as an alternative to the first chamber 324.

According to an embodiment of the invention, at least one of the chambers communicates pneumatically with an exhaust (not shown). According to an embodiment, the third chamber 326 communicates pneumatically with the exhaust. The discussion below refers solely to the third chamber 326 being in communication with the exhaust for the purpose of clarity. However, it should be understood that other chambers may be in communication with the exhaust in addition to or as an alternative to the third chamber 326. In some embodiments, where the third chamber 326 is in communication with the exhaust, the sealing member 322d may be omitted and the third chamber 326 may comprise the exhaust. When the sealing member 322d is provided, the third chamber may include a separate port (not shown) which exhausts to the environment. It should be understood that in some embodiments, the third chamber 326 may be omitted. In this embodiment, instead of a third chamber 326, the proportional actuator valve 110 may comprise less than three chambers and an exhaust. Therefore, while the discussion below refers to three chambers, the invention should not be limited to this embodiment.

According to an embodiment of the invention, at least one of the chambers is closed off to both the operating pressure and the exhaust. In one embodiment, this chamber comprises the second chamber 325. While the discussion below refers solely to the second chamber 325 being closed off to the operating pressure and exhaust, it should be understood that other chambers may be closed off either in addition to or as an alternative to the second chamber 325. When the proportional actuator valve 110 is provided, the actuator 100 can communicate with the exhaust and the pressurized air supply by going through the proportional actuator valve 110.

FIG. 4 shows the second chamber 325 of the proportional actuator valve 110 in greater detail. As can be seen, the valve slider 113 can include one or more bores 327 and 328. While the figures only show a bore 327 and a bore 328, it should be understood that additional bores may be provided. The bores are provided to communicate between the actuator 100 and the chambers 324, 325, 326. In some embodiments, the supply line 114 can be provided to communicate with the bore 328 and with the actuator 100. The supply line 114 can be coupled to the end of the valve slider 113 as shown in FIG. 3, or alternatively, can be coupled to the actuator housing 112. While the bores 327 and 328 are shown, it should be understood that the bores could be omitted, in which case, the exit of the second chamber 325 would lead through the proportional actuator valve housing 112. In this case, the supply line 114 would be coupled to the proportional actuator valve housing 112.

Also in communication with the bores 327, 328 can be provided one or more grooves 329. While two grooves 329 are shown, this is only for clarity and it should be understood that any number of grooves could be utilized and the claims should not be limited to two grooves 329. Furthermore, while the groove 329 is shown in the middle of the valve slider 113, it should be understood that grooves could be supplied in alternative or additional locations along the valve slider 113. For example, in some embodiments, one or more grooves could be provided in the valve slider 113 and positioned such that when the valve slider 113 is in the middle position, there is a groove located in chamber 324 and a groove located in chamber 326. In this embodiment, the bore 327 can be omitted and the supply line 114 can be coupled directly to the housing 112. Alternatively, one or more grooves could be formed in the housing 112 and the sealing members 322a-d could be located on the valve slider 113 (see FIG. 7). The groove 329 allows the chambers to communicate with the bores 327, 328. Thus, the combination of grooves and bores allow the chambers of the proportional actuator valve 110 to communicate with the actuator 100.

Figure 5A:
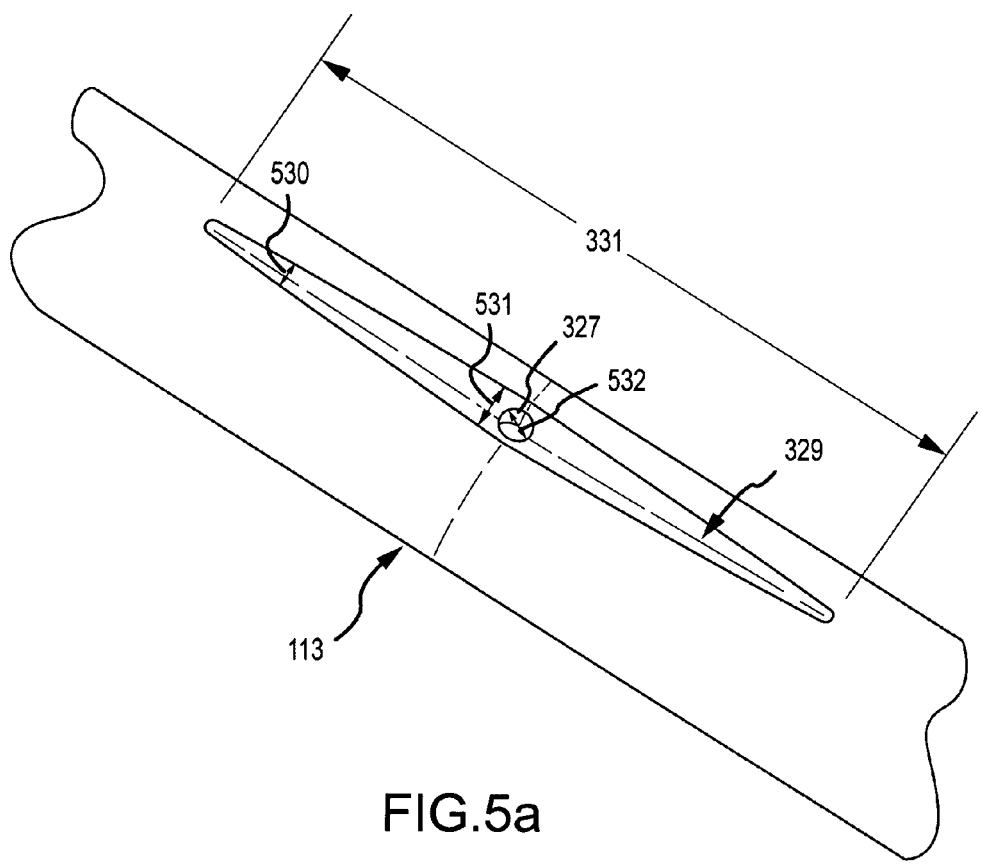
FIG. 5a shows a valve slider with a groove and bore formed therein.

According to an embodiment of the invention, a groove 329 of the one or more grooves 329 has a non-uniform cross sectional area (see for example, FIG. 5a). FIG. 5a shows the groove 329 having a non-uniform cross sectional area according to an embodiment of the invention. However, it should be understood, that the grooves 329 could comprise any cross sectional shape and should not be limited to a non-uniform cross sectional area. In some embodiments, the one or more grooves 329 have a substantially uniform cross sectional area.

As shown in FIG. 5a, the cross sectional area 531 near the bore 327 is larger than the cross sectional area 530 farther away from the bore 327. FIG. 5a shows the cross sectional shape of the groove 329 changing in more than one dimension. For example, as the distance from the bore 327 increases, the groove 329 becomes both narrower and shallower. In alternative embodiments, the groove 329 may be shaped such that the groove 329 only becomes either narrower or shallower. Therefore, the precise shape of the groove 329 should not be limited to that depicted in FIG. 5a. By forming the groove 329 with such a cross sectional area, the actuating valve 110 provides for proportional distribution of pneumatic pressure.

Figure 5B:
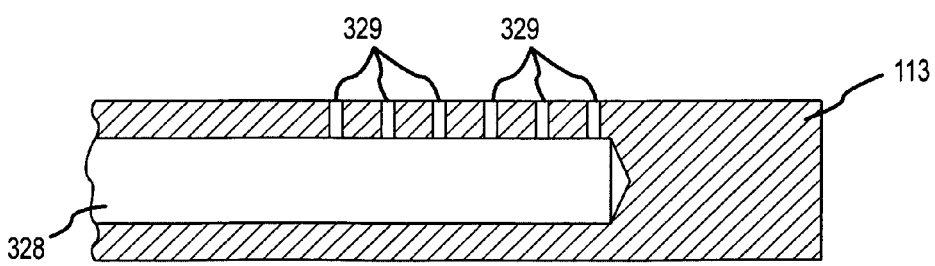
FIG. 5b shows the valve slider with the one or more grooves comprising a plurality of bores formed therein.

FIG. 5b shows the one or more grooves 329 according to another embodiment of the invention. In this embodiment, the one or more grooves 329 comprise a plurality of bores. The plurality of grooves 329 are shown as being discontinuous, i.e., the grooves 329 are separate. It should be understood however, that some or all of the grooves 329 could form a continuous groove. As shown in FIG. 5b, the plurality of grooves 329 lead directly to the bore 328. In this embodiment, the one or more bores 327 can be omitted because the plurality of grooves 329 comprises a plurality of bores. In previous embodiments, the one or more bores 327 functioned to restrict the flow of pneumatic pressure. However, in the embodiment shown in FIG. 5b, the plurality of grooves 329 can act to restrict the flow of pneumatic pressure.

The plurality of grooves 329 are shown as being substantially uniform in cross sectional area as well as substantially uniformly spaced along the valve slider 113. However, it should be understood that the plurality of grooves 329 can be formed with different diameters in order to achieve desired pneumatic pressure flow. Additionally, the plurality of grooves 329 can be spaced along the valve slider 113 at different distances in order to control how many grooves 329 are open to a chamber at a given displacement.

As shown in the Figures, as the distance from the bore 327 increases, the cross sectional area of the groove 329 decreases. While the cross sectional area 531 of the groove 329 near the bore 327 is shown as being at least as large as the cross sectional area 532 of the bore 327, it should be understood that the cross sectional area 531 of the groove 329 could be smaller than the cross sectional area 532 of the bore 327. By providing the groove 329 with a larger cross sectional area than the cross sectional area 532 of the bore 327, the bore 327 determines the maximum flow of the proportional actuator valve 110. However, the bore 327 could have a larger cross sectional area, in which case, the groove 329 would determine the maximum flow of the proportional actuator valve 110.

Referring back to FIGS. 3 & 4, the proportional actuator valve 110 is operable as follows. When the element 104 is in its optimal position, the valve slider 113 is positioned in the middle of the proportional actuator valve 110 as shown in FIGS. 3 & 4. The optimal position may be adjusted by adjusting the position of the base 111 (See FIGS. 1 & 2). However, as the first force 105 fluctuates, the element 104 may move either up or down. As a result of the proportional actuator valve 110 being coupled to the element 104, the proportional actuator valve 110, and specifically, the proportional actuator valve housing 112, also moves relative to the valve slider 113.

If the first force 105 increases and the second force 106 is held constant, for example, the first force 105 is no longer substantially equal to the second force 106 provided by the actuator 100 and the element 104 moves downward. Because the proportional actuator valve housing 112 is coupled to the element 104, it also moves down (or to the right as shown in FIGS. 3 & 4). Because the valve slider 113 is attached to the base 111, the valve slider 113 does not move. Similarly, if the first force 105 decreases and the second force 106 is held constant, the element 104, and thus, the proportional actuator valve housing 112 moves up (or to the left as shown in FIGS. 3 & 4).

As can be seen in FIGS. 3 & 4, the length 331 of the groove 329 is less than the distance between the sealing members 322b&c. As a result, small movements, i.e., those movements less than the distance 332 of the sealing points 323b&c do not result in pneumatic pressure flowing into or out of the actuator 100. This is because the second chamber 325 is closed off from both the pressurized air supply and the exhaust. Therefore, when the valve slider 113 is in the middle position, the pneumatic pressure in the actuator 100 remains constant.

However, if the proportional actuator valve housing 112 moves a distance that is greater than the distance 332, then a portion of the cross sectional area 530 of the groove 329 moves through the sealing point 323b or 323c and opens a defined cross sectional area. Further movement results in a greater cross sectional area of the groove 329 being opened.

According to an embodiment of the invention, the proportional actuator valve 110 is provided to maintain the position of the element 104. According to this embodiment, the first chamber 324 is charged with the operating pressure and the third chamber 326 communicates with the exhaust (not shown) to the outside. If the first force 105 acting on the element 104 increases, the proportional actuator valve housing 112 will move to the right as shown in FIGS. 3 & 4. As this occurs, the groove 329 moves through the sealing point 323b and a defined cross sectional area of the groove 329 is opened to the first chamber 324. Because the first chamber 324 is charged with the operating pressure, pneumatic pressure enters the groove 329 and flows into the bore 327 and then to the bore 328. The bore 328 can be coupled to the actuator 100. Thus a given amount of pneumatic pressure is supplied to the actuator 100. As the housing 112 moves further to the right, a greater cross sectional area is open to the chamber 324. This results in a greater amount of pressure entering the groove 329.

As the actuator 100 is supplied with pneumatic pressure, the second force 106 increases and the element 104 along with the actuator housing 112 begins to return to their original positions. As this return occurs, the actuator housing 112 moves back to the left (as shown in FIGS. 3 & 4) and a smaller cross sectional area of the groove 329 is open to the first chamber 324. Because the open cross sectional area decreases, the amount of pressure supplied to the actuator 100 also decreases until there is no portion of the groove 329 open to the first chamber 324. As the open cross sectional area decreases, the speed of return also decreases. The proportional actuator valve 110 avoids overshooting and entering into resonance oscillations because the amount of air supplied to the actuator 100 is proportional to the position of the actuator housing 112 relative to the valve slider 113.

Because the cross sectional area of the groove 329 decreases in area as the distance away from the bore 327 increases, when the end of the groove 329 is opened to the first chamber 324, only a small amount of air will enter the groove 329 and thus only a small amount of pressure is supplied to the actuator 100. Thus, the amount of pressure supplied to the actuator 100 is proportional to the position of the valve slider 113 relative to the proportional actuator valve housing 112.

If instead, the first force 105 decreases, the element 104 and thus, the proportional actuator valve housing 112 will move to the left as shown in FIGS. 3 & 4. If the proportional actuator valve housing 112 moves a distance greater than distance 332, the groove 329 will pass through the sealing point 323c and a defined cross sectional area of the groove 329 will open into the third chamber 326 or directly to the exhaust in embodiments where the third chamber 326 is omitted. Because the third chamber 326 is open to the exhaust, air flows through the bores 327 and 328 and exhausts into the environment. As the proportional actuator valve housing 112 moves farther to the left, a greater cross sectional area of the groove 329 is opened to the third chamber 326, resulting in a greater amount of air and pneumatic pressure to exhaust into the environment. As a result of the loss of the pneumatic pressure, the element 104 and proportional actuator valve housing 112 drops (moves to the right) back to the original position. As the valve slider 113 moves back into the middle chamber 325, the groove 329 is no longer open to the chamber 326 and thus, pneumatic pressure is no longer exhausted to the environment.

The stroke of the proportional actuator valve housing 112 relative to the valve slider 113 ends before the groove 329 can reach the exterior sealing points 323a and 323d of the outer sealing members 322a and 322d. This prevents undesired pneumatic pressure exhaust. This also prevents dirt and debris from entering the bore 327, which could cause damage to the proportional actuator valve 110 or the actuator 100.

The cross sectional shape of the one or more grooves 329 allows the amount/rate of the pneumatic pressure entering or exiting from the bore 327 to decrease as the cross sectional area open to the first or third chamber decreases. In this manner, the oscillation that typically occurs from overshooting is reduced or eliminated. Additionally, the proportional actuator valve 110 allows for a faster response than may be realized in shift valves for example. This is because in a shift valve, the size of the groove must be compromised against the risk of oscillations. Therefore, the groove/bore of a shift valve may be sized smaller than actually desired in order to avoid oscillations. However, providing a smaller groove/bore results in a slower response time because the rate at which pneumatic pressure can be supplied to the actuator is reduced. The proportional actuator valve 110 allows for a fast response time while at the same time reducing the risk of oscillations.

Figure 6:
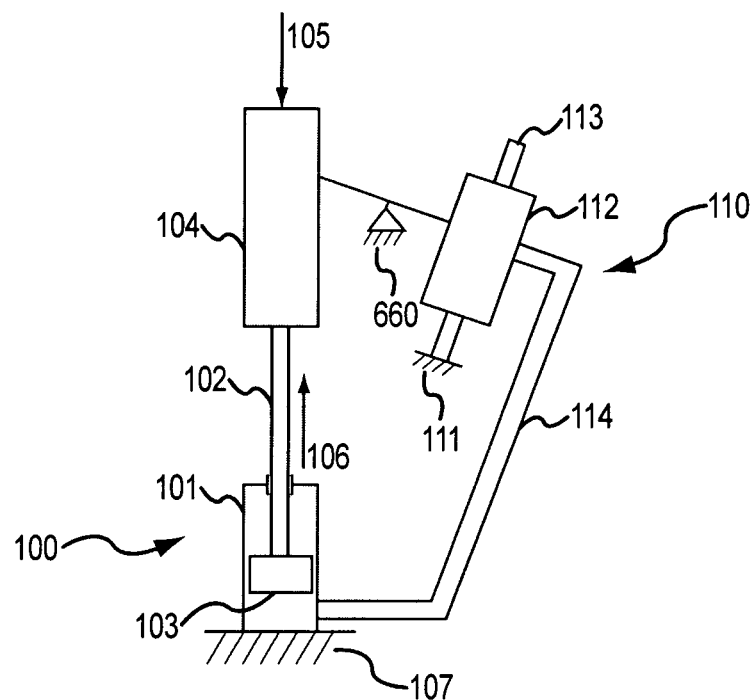
FIG. 6 shows the actuator and the proportional actuator valve coupled using a lever system.

FIG. 6 shows the proportional actuator valve 110 according to another embodiment of the invention. In this embodiment, the proportional actuator valve housing 112 is coupled to the element 104 using a lever system 660. The use of the lever system 660 provides a number of advantages. In some embodiments, it may be desirable to have the movement of the element 104 be in a direction different than the movement of the proportional actuator valve 110. Additionally, the lever system 660 allows the movement of the element 104 to be in a direction different from the movement of the valve slider 113. In the embodiment shown in FIG. 6, as the element 104 rises, in response to a decrease in the first force 105, for example, the proportional actuator valve housing 112 lowers. Another advantage in providing the lever system 660 is that the proportional actuator valve 110 may be located remote from the element 104. This may be desired for a number of reasons including accessibility, space constraints, etc.

The lever system may also be adjusted to change the stroke of the proportional actuator valve 110 relative to the element 104. Because the element 104 has the same stroke as the actuator 100, the lever system may be adjusted to change the stroke of the proportional actuator valve 110 relative to the actuator 100. For example, when the proportional actuator valve 110 is coupled directly to the element 104, any movement in the element 104 results in an equivalent movement in the proportional actuator valve housing 112. However, it may be desired to provide for the strokes to be different. By adjusting the lever system 660, a relatively small movement in the element 104 can result in a greater movement in the proportional actuator valve housing 112. This allows for a faster response time with greater sensitivity.

Figure 7:
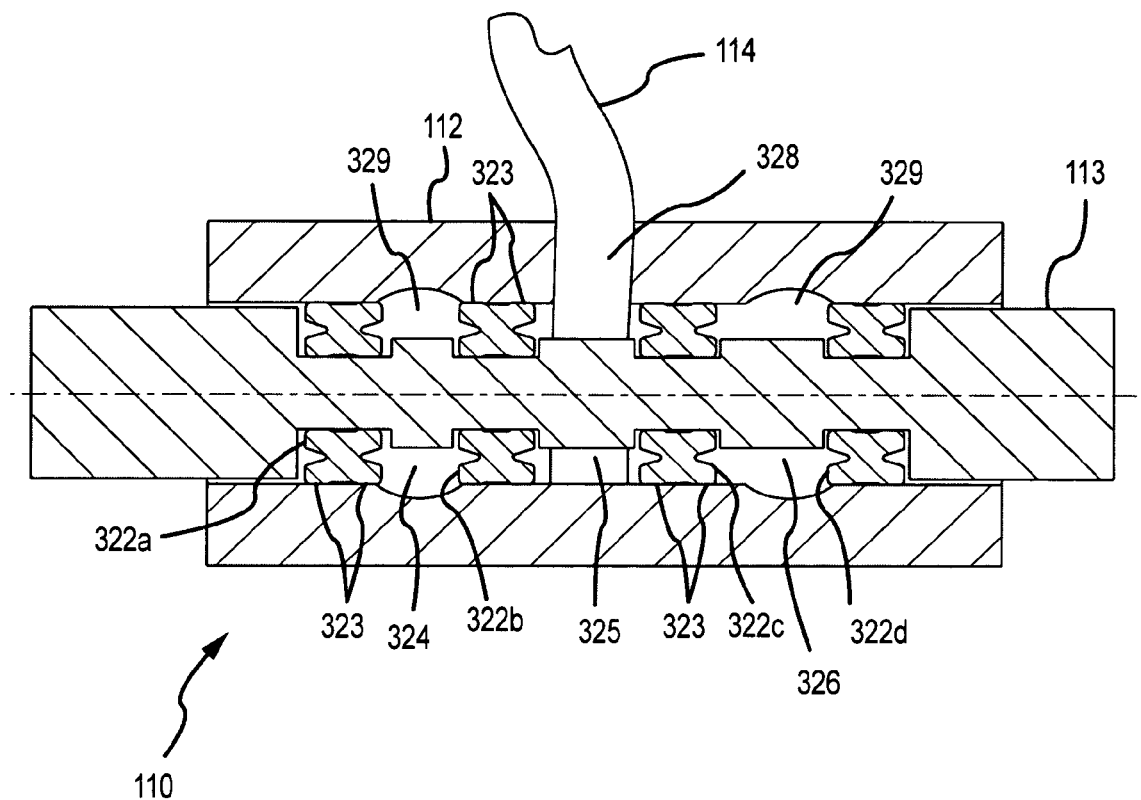
FIG. 7 shows the proportional actuator valve according to another embodiment of the invention.

FIG. 7 shows the proportional actuator valve 110 according to another embodiment of the invention. The proportional actuator valve 110 shown in FIG. 7 is similar to that shown in the previous figures. The difference is in the location of the grooves 329. The one or more grooves 329 are shown as being formed in the housing 112 rather than in the valve slider 113. With the grooves 329 being formed in the housing 112, the one or more sealing members 322 are coupled to and move with the valve slider 113 rather than being stationary in the housing 112. Additionally, the one or more sealing members 322 are shown as sealing members 322 with sealing points 323 on both sides. While this particular embodiment of the sealing members 322 are only shown in FIG. 7, it should be understood that they could be implemented in any of the embodiments mentioned.

In the embodiment shown in FIG. 7, as the valve housing 112 moves relative to the valve slider 113, the grooves 329 pass the sealing members 322 and a defined cross sectional area is open to the second chamber 325. As the displacement increases, a greater cross sectional area is open to the second chamber 325. This allows for a greater amount of air to either enter or exit the bore 328. In the embodiment shown, the bore 327 is omitted. The bore 327 is not necessary in the embodiment shown because the sealing members 322 move with the valve slider 113 and so once a defined cross sectional area of the one or more grooves 329 are open to the second chamber 325, air can reach the bore 328 without the need for bore 327. However, the bore 327 may be provided in the valve housing 112 in order to restrict the flow of the proportional actuator valve 110.

Additionally, the bore 328 is formed in the valve housing 112, rather than in the valve slider 113. However, it should be understood that the valve slider 113 could include both the bores 327, 328, in which case, the proportional actuator valve 110 would communicate with the actuator 100 as described above. As shown in FIG. 7, the proportional actuator valve 110 communicates with the actuator 100 through the bore 328, formed in the valve housing 112 and with the supply line 114.

The combination of the actuator 100 and the proportional actuator valve 110 provide for a mechanic-pneumatic closed control loop. The closed control loop provides for both position control and position adjustment of the actuator 100 and the element 104. The combination provides for a direct determination of the position of the actuator 100 without the need for external measurements. The combination additionally provides for an automatic response and adjustment without the need for manual repositioning upon a change in the applied force on the actuator 100. The combination additionally provides for a reduction of the risk of resonance created by adjustments due to force fluctuations.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other actuators and actuator valves, and not just to the embodiments described above and shown in the accompanying figures. Accordingly, the scope of the invention should be determined from the following claims.

I claim:

1. A proportional actuator valve (110) adapted for position control and position adjustment, said proportional actuator valve (110) comprising:
   a valve housing (112) having at least two chambers (324, 325);
   a valve slider (113), said valve slider (113) being movable within said valve housing (112);
   one or more grooves (329) formed in said proportional actuator valve, wherein said one or more grooves (329) pneumatically communicate with said at least two chambers (324, 325) of said valve housing (112); and
   one or more bores (327, 328) formed in said proportional actuator valve, wherein said one or more bores (327, 328) pneumatically communicate with said one or more grooves (329); and
   wherein movement of said valve slider (113) relative to said valve housing (112) provides a pneumatic valve action.

2. The apparatus of claim 1, wherein said one or more grooves (329) comprise a non-uniform cross sectional area.

3. The apparatus of claim 1, wherein said one or more grooves (329) are formed in said valve slider (113).

4. The apparatus of claim 1, wherein said one or more grooves (329) comprises a cross-sectional area that is shaped such that the cross-sectional area decreases with increasing distance from said one or more bores (327, 328).

5. The apparatus of claim 1 or claim 4, wherein a maximum cross sectional area of said one or more grooves (329) is at least as large as a cross-area of said one or more bores (327, 328).

6. The apparatus of claim 1 or claim 4, wherein a maximum cross sectional area of said one or more grooves (329) is smaller than a cross sectional area of said one or more bores (327, 328).

7. The apparatus of claim 1, wherein said one or more bores (327, 328) are formed in said valve slider (113).

8. A method for forming a proportional actuator valve, said method comprising:
   providing a valve housing;
   separating said valve housing into at east two chambers using a plurality of sealing members;
   positioning a valve slider within said valve housing;
   forming one or more bores in said proportional actuator valve; and
   forming one or more grooves in the proportional actuator valve, wherein said one or more grooves communicate with said one or more bores and with said at least two chambers.

9. The method of claim 8, wherein said one or more bores are formed in said valve slider.

10. The method of claim 8, further comprising forming said one or more grooves having a non-uniform cross sectional area.

11. The method of claim 8, further comprising forming said one or more grooves in said valve slider.

12. The method of claim 8, wherein said one or more grooves comprise a shape such that a cross sectional area decreases with increasing distance from said one or more bores.

13. A method for regulating pneumatic air to a pneumatic actuator, said method comprising:

coupling an element to a pneumatic actuator, wherein a first force acts on said element and said pneumatic actuator provides a second three on said element opposite the first force;

providing a proportional actuator valve, wherein said proportional actuator valve controls a supply of air to and from said pneumatic actuator; and wherein the proportional actuator valve comprises one or more grooves, wherein a cross sectional area open for air flow is determined by a change in the first force acting on said element.

14. The method of claim 13, wherein said proportional actuator valve further comprises a valve housing, wherein said valve housing is coupled to said element.

15. The method of claim 13, further comprising using a lever system to couple said proportional actuator valve to said element.

16. The method of claim 13, further comprising forming said one or more grooves in a valve slider of the proportional actuator valve.

17. The method of claim 13, further comprising forming said one or more grooves with a variable cross sectional area.

18. The method of claim 13, further comprising forming said one or more grooves as a plurality of bores.

19. The method of claim 13, further comprising forming one more bores in said valve slider to communicate with said actuator and forming said one or more grooves with a shape such that a cross sectional area of said one or more grooves decreases with increasing distance from said one or more bores.

20. The method of claim 13, further comprising positioning said one or more grooves such that a rate at which air is supplied to the actuator by said proportional actuator valve increases as a stroke of said proportional actuator valve increases.

* * * * *